No. 789,657. Patented May 9, 1905.

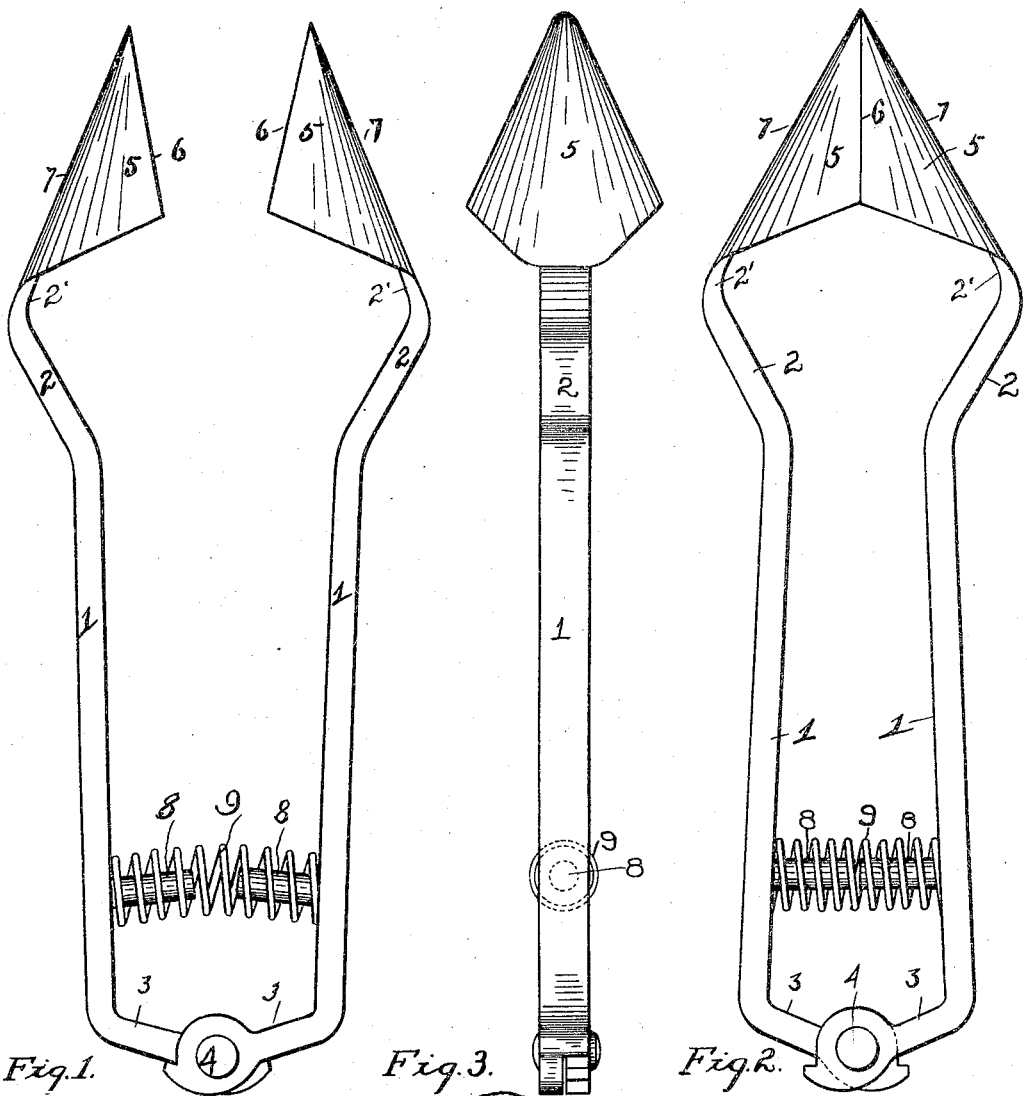

UNITED STATES PATENT OFFICE.

PERRY J. EBY, OF TROTWOOD, OHIO.

FRUIT OR VEGETABLE CORER.

SPECIFICATION forming part of Letters Patent No. 789,657, dated May 9, 1905.

Application filed February 27, 1905. Serial No. 247,423.

*To all whom it may concern:*

Be it known that I, PERRY J. EBY, a citizen of the United States, residing at Trotwood, in the county of Montgomery and State of Ohio, have invented certain new and useful Improvements in Fruit or Vegetable Corers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an implement for removing the cores from fruits and vegetables—such, for example, as tomatoes, apples, &c.—and for also removing the eyes from pineapples. Therefore the implement may be termed a "core and eye remover."

The implement is a hand-operative device, and the coring-blades have a special construction which is of a complete conical shape when the blades are brought together, and this peculiar construction possesses the advantages hereinafter set forth.

Preceding a detail description of the invention, reference is made to the accompanying drawings, of which—

Figure 1 illustrates the implement open. Fig. 2 represents the implement closed. Fig. 3 is a view of either Figs. 1 or 2 looking at right angles thereto. Fig. 4 is a view showing the two positions of the blades in their relations with an apple.

In a detail description of the invention similar reference characters indicate corresponding parts.

The two arms or members 1 1 are pivoted at 4 and lie outwardly from their pivot by bending said arms, as at 3, in order that the straight or parallel portions of said arms may lie in planes parallel with the cutting edges 6 of the blades 5 when the implement is closed, as in Fig. 2. In order to effect the proper connection between said arms and said cutting-blades, the arms are bent outwardly, as at 2, and thence inwardly, as at 2', to bring them parallel with the outer tapering sides of the blades 5 5, to which they are connected at the middle. I therefore have a portion of the arms 1 1 parallel with the inner cutting edges 6 of the blades and other portions of said arms parallel with the outer or tapered surfaces 7 of said blades. This is necessary in order to obtain the complete conical shape of said blades, hereinbefore referred to, when they are brought together. One of said blades 5 is a duplicate of the other, and they are so formed and rounded that when brought together they form a funnel-shaped receptacle which retains the core in withdrawing said blades and which readily releases said core when the blades are allowed to spring apart. The blades so formed come together at their extreme outer ends in points, which are pressed into the apple, tomato, or other article of fruit only a sufficient extent to enable a hold. After the blades are so given their initial entrance or pressure they are pressed together by the hand of the operator, and the apple or other article of fruit is drawn onto the implement until the entire core enters the blades, after which the blades are completely closed and are withdrawn with said core. The tapering sides or surfaces 7 of said blades are instrumental in drawing the article of fruit or vegetables onto the blades, or, in other words, enable the blades to enter the fruit to the limit of their penetration by simply closing the jaws or arms 1 until the blades are brought together. Slight pressure may be given the article in the operation of coring by pressing it onto the blades while said blades are being closed. The blades are maintained in an open position by a coil-spring 9, which is supported on pins 8, projecting from the arms.

Having described my invention, I claim—

1. In a fruit or vegetable corer, the arms 1 1 lying parallel and extending inwardly at one end where they are pivotally connected, and extending outwardly and then inwardly at the other end, the blades 5 5 having abutting cutting edges which are parallel when closed, and outward tapering sides, connected to the inwardly-bent ends of said arms, so that the ends of said arms are in line with the outer tapered surfaces of said blades, as herein shown and described.

2. In a fruit or vegetable corer, the blades 5 5 having straight abutting cutting edges 6 and outward tapering surfaces 7, said blades being so constructed to form a hollow cone when brought together, the arms 1 1 extending outwardly and thence inwardly and having a connection at their inwardly-extending terminals with the tapering sides of the blades, said arms extending inwardly at their other extreme ends and having a pivotal connection thereat, as herein shown and described.

In testimony whereof I affix my signature in presence of two witnesses.

PERRY J. EBY.

Witnesses:
R. J. McCarty,
C. M. Theobald.